April 17, 1951
G. W. DEMUTH
2,548,955
EXCITER SYSTEM FOR THYRATRON POWER
INVERTERS AND THE LIKE
Filed Sept. 13, 1949
2 Sheets-Sheet 1
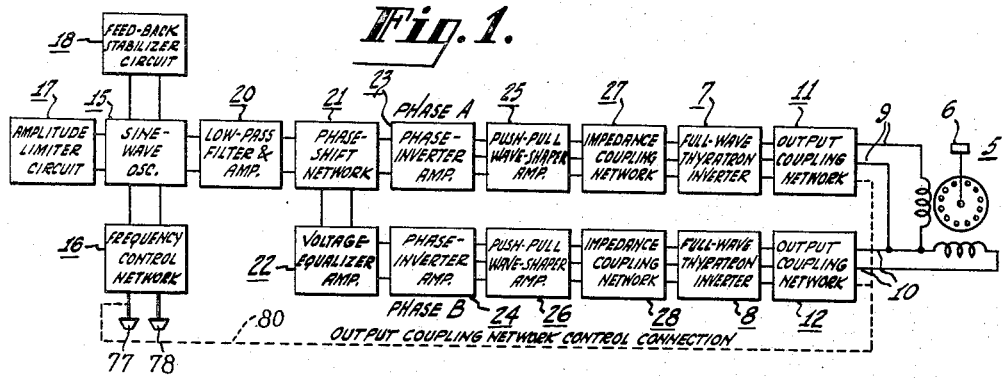
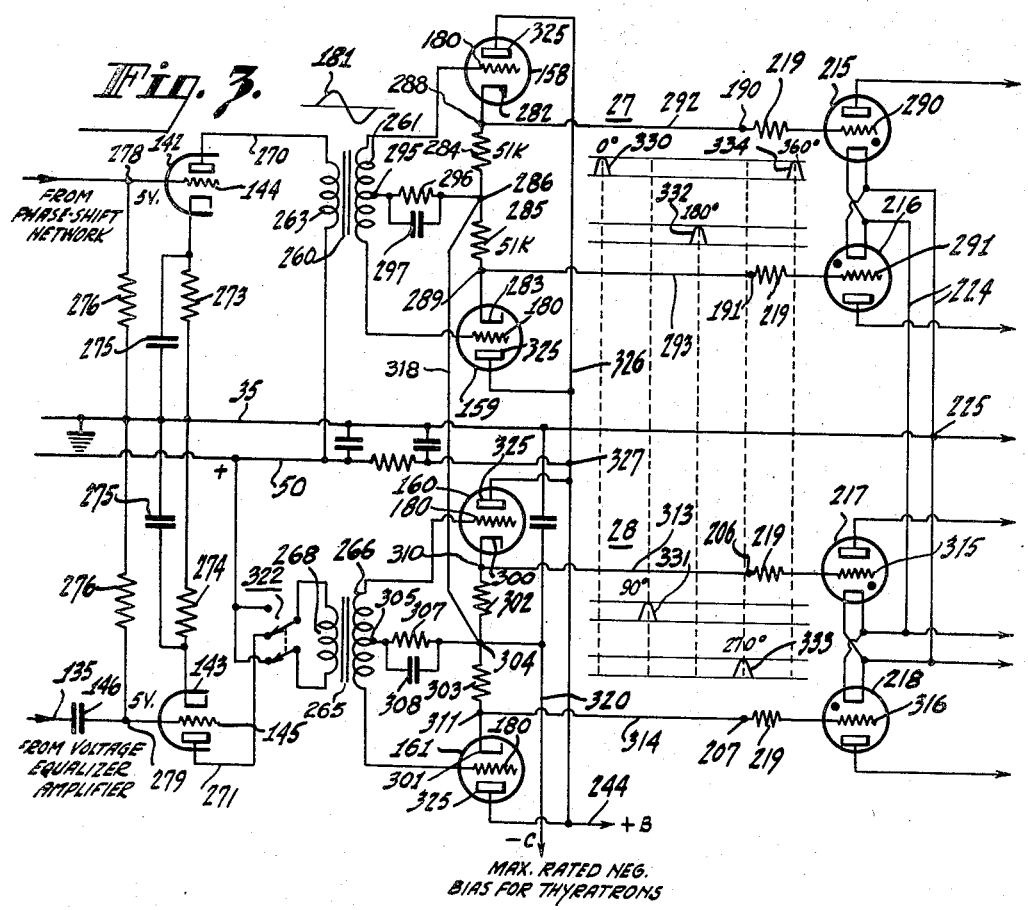
INVENTOR
GALAN W. DEMUTH
BY
ATTORNEYS April 17, 1951

G. W. DEMUTH 2,548,955

EXCITER SYSTEM FOR THYRATRON POWER
INVERTERS AND THE LIKE

Filed Sept. 13, 1949

2 Sheets-Sheet 2

INVENTOR
GALAN W. DEMUTH
by
Wright Brown Quinby May
ATTORNEYS

Patented Apr. 17, 1951

2,548,955

UNITED STATES PATENT OFFICE 2,548,955

EXCITER SYSTEM FOR THYRATRON POWER INVERTERS AND THE LIKE

Galan W. Demuth, Moorestown, N. J., assignor to Bryant Chucking Grinder Company, Springfield, Vt., a corporation of Vermont Application September 13, 1949, Serial No. 115,526

22 Claims. (Cl. 315—229)

The present invention relates to frequency control or exciter systems for thyratron power inverters and the like, and has for its primary object, to provide an improved frequency control or exciter system for operation of thyratron inverters and the like at relatively high frequencies with maximum efficiency.

It is also a further and more specific object of the present invention, to provide an electronic two-phase high frequency triggering pulse generator system for the control of thyratron power inverters and the like, in alternating current variable speed industrial motor applications.

A variable frequency power supply system for the speed control of alternating current industrial electric motors and the like, of the type to which the present invention is particularly related, is shown, described and claimed in a copending application of Willis F. Moore, Serial No. 57,237, filed October 29, 1948, for Variable-Frequency Power-Supply System, and assigned to the same assignee as this application.

In the system referred to, a variable-frequency oscillator is coupled to a full-wave grid-controlled gaseous discharge tube or thyratron power inverter for triggering the inverter at the oscillator frequency and providing alternating current power therethrough for high-speed induction motors adapted for directly driving tool elements in high-speed grinding, woodworking, and other industrial operations. By varying the operating frequency of the oscillator and thereby the rate of triggering of the thyratrons through special circuit means, the speed of the motor is varied or adjusted as desired. This electronic variable-frequency power supply system thus provides improved means for deriving and controlling high frequency alternating current power for the operation of high-speed industrial motors.

It is also an object of the present invention to provide an improved high frequency exciter or control system for thyratron power inverters and the like, which is adapted for two-phase or other polyphase operation, and for the production and application to thyratron inverters of variable frequency triggering pulse waves of predetermined polarity and amplitude, whereby more efficient operation of thyratron inverters in high-speed motor control systems and the like may be attained.

It is also a further object of the present invention to provide a high frequency triggering pulse generator or exciter system for polyphase thyratron power inverters and the like, whereby a plurality of full-wave thyratron inverter power control circuits may be operated simultaneously thereby for the production of polyphase alternating current power, for high speed industrial motors and the like.

In an alternating current power supply system for operation at relatively high frequencies, for example in a range of audio frequencies of from five hundred cycles to two thousand cycles and higher, the deionizing time of the thyratrons and the constants of the circuits for both power output and triggering must be carefully coordinated to provide effective power output. In particular, the sine-wave source of triggering potential, and the modification of the sine wave to provide a corresponding peaked pulse wave, are important for the proper excitation of the thyratrons for the production of high frequency alternating current power in such systems.

It is, therefore, a further and important object of this invention, to provide a sine-wave-based, triggering-pulse wave exciter system for one or more thyratron power inverters with full wave output in a high frequency power supply circuit. It is likewise an object of the invention, to provide such an excitation system that is adapted for unitary self-contained construction, and which may be applied to the single phase operation of a single pair of thyratrons.

In accordance with the invention, a tunable oscillator is provided with amplitude and feedback stabilizing and low-pass filter circuits, whereby a substantially smooth sine-wave output may be obtained with substantially constant amplitude and, when desired, with variable-frequency control over a predetermined, relatively wide frequency range within the limits above referred to. The oscillator is suitably coupled to a phase-shift network and voltage equalizer circuit, whereby a two-phase or polyphase variable frequency output voltage may be obtained from the oscillator, for polyphase excitation of high frequency inverters.

The operation of the system in accordance with the invention, is such that the input alternating current signal voltage for each phase is substantially a sine wave of practically constant amplitude for all frequencies within the range of operating frequencies desired, and is substantially symmetrical. The signal voltage in each phase is thereafter applied to suitable phase inverter stages, which provide for push-pull operation in each phase for triggering or excitation of the full-wave thyratron inverter stages which follow in the power control circuit. Between the phase inverter section of the variable frequency control system and the utilization or thyratron circuit, a wave-shaper circuit with push-pull input is introduced in each phase or amplifying channel for transforming the smooth sine wave into spaced, substantially sharp voltage pulses of predetermined polarity and amplitude, and the final output potential in each phase or channel is directly coupled to the utilization circuit or thyratron stage through suitable coupling circuits or networks whereby the pulse wave shape is maintained.

The oscillator is adapted for operation over a relatively wide frequency range in a series of steps, being variable therebetween or fixed, as desired for any particular application. A variable frequency control system in accordance with the present invention is particularly adapted for the production of two-phase push-pull alternating current triggering or excitation voltages of variable frequency, and the system, furthermore, is adapted for unitary assembly on a single chassis or supporting structure for application to existing apparatus of the type referred to, as a control unit, and is therefore provided with its own plate or power supply circuit. The system also involves the use of a plurality of electronic oscillator and amplifier tubes, many of which may be dual triodes for simplicity of construction. The whole unit is adapted for plug-in connection with the remainder of the power supply system for which it is the controlling element, as will hereinafter be seen.

In its application to a two-phase power supply system adapted, for example, to the operation of a two-phase high-speed motor, or other polyphase power circuits, an embodiment of the invention may include an electronic oscillator which provides a two-phase output voltage by means of a resistance-capacitance or a resistance-inductance voltage divider system. The wave form of the oscillator voltage is rendered sinusoidal through the use of the low pass filter which removes harmonics above the highest desired frequency, for example above 1700 cycles, in order to enable proper phase division with either of the divider systems referred to, and is suitably limited in amplitude.

The two-phase control voltage thus generated and derived may subsequently be applied to push-pull amplifier stages through phase inverter means, resulting in a push-pull sine wave of large amplitude in each of the two phases. The final amplifier stages for each phase are suitably controlled and biased so that the sinusoidal wave causes a plate current to flow for less than half of one cycle. The output wave form for each of the two phases is thus given a pulse shape suitable for controlling a thyratron power circuit for full-wave operation with maximum efficiency. The same arrangement may also be provided for other polyphase circuits in which the sinusoidal wave is subsequently modified to the pulse shape.

Another feature of the invention is involved in the special equalizing amplifier for one phase of the two-phase system, which automatically regulates the signal voltage to equal the amplitude of the signal voltage of the other phase at all adjustments of the frequency. This is for the reason that, for example, in the two-branch resistance-capacitance voltage divider system which produces the two output voltage components, the lagging phase follows the original voltage wave by ninety degrees, and tends to vary widely in amplitude with frequency change, being referred to hereinafter as phase B. The other or direct voltage component is relatively constant, and is referred to hereinafter as phase A.

Accordingly, it will be seen that it is an object of this invention to provide an improved electronic high-frequency system for producing a two-phase voltage for thyratron excitation or control, and thereby for more effectively and efficiently controlling the operation of high-speed motors for industrial applications, particularly in the field of high-speed internal grinding, where the tool speeds may reach values as high as 100,000 R. P. M. and higher. For such work, high-speed two-pole squirrel cage induction motors are provided, having relatively small rotors directly connected with the grinding wheel tool.

With such motors, it will be seen that, for a speed of approximately 36,000 R. P. M., a supply of 600 cycles per second may be provided, whereas for higher speeds, such as aproximately 180,000 R. P. M., for example, a supply frequency of 3,000 cycles per second may be provided. It is to such range of frequencies that the high frequency exciter or control system of the present invention is particularly adapted.

It is likewise an object of this invention, to provide an improved variable frequency exciter or control system for generating two-phase excitation voltages for the full-wave operation of a thyratron inverter or a plurality of inverters, which is readily adjustable over a wide frequency range without variation in the output voltage of either phase, and which operates to maintain an output wave form for each of the two phases which is of a pulse shape and polarity suitable for controlling the thyratron circuit with maximum efficiency.

While the polarity of the pulse wave applied to a thyratron inverter of the push-pull type may include positive and negative alternate pulses corresponding to the alternations of the initial sine wave, for extremely high frequency operation of the thyratron inverters in the range of frequencies referred to hereinbefore, including, for example, frequencies of from 1700 to 2000 cycles and higher, as are required for high speed induction motor operation, the steady state negative bias on the thyratrons is, according to the invention, maintained near the limit of the normal tube rating to obtain a more rapid deionization time. Under such conditions of operation, no negative pulses can be tolerated on the open tube without risking tube breakdown between the control grid and other electrodes.

Therefore, it is a further and important object of this invention, to provide an improved high frequency exciter system for thyratron inverters which operates to produce positive triggering pulses of predetermined amplitude, duration and shape, while suppressing the corresponding negative half-wave pulses. Such a system, in accordance with the invention, permits the maximum negative bias on each thyratron inverter stage for producing effective or full deionization even at the highest frequency, and requires a relatively high degree of amplification or pulse amplitude for proper triggering action.

Protective series resistance means in the thyratron grid circuits prevent the application of positive grid voltages higher than a relatively low normal value, as the thyratrons presently used are designed to fire at relatively low voltages. In the design of the exciter system, the gain from the oscillator through the system, to the thyratron grids, is adjusted so that at substantially all frequencies, the pulse peaks are of such magnitude as to overcome the negative bias and to provide the positive voltage limit indicated. In the case of over-excitation, the series grid resistors serve to maintain the voltage on the grids at the upper limit.

The novel features that are considered to be characteristic of this invention are set forth with particularity in the appended claims. The invention itself, however, both as to a specific organization and a preferred method of operation, as well as additional objects and advantages thereof, will further be understood from the following description when read in connection with the accompanying drawings, in which:

Figure 1 is a schematic block diagram of a frequency control or exciter system for thyratron power inverters and the like, embodying the invention;

Figure 2 is a schematic circuit diagram of the frequency control or exciter system shown in Figure 1, showing the details of a preferred embodiment of the invention as applied to the triggering of a full-wave, two-phase thyratron inverter in a high frequency power supply system; and Figure 3 is a schematic circuit diagram of a portion of the circuit of Figure 2, showing a modification of the invention.

Referring to Figure 1, the invention is shown in its application to the control of a two-phase, high-speed motor 5, which is directly connected to drive a high-speed tool 6, such as a grinding wheel, which may operate in a speed range of the order of from 3,000 to 100,000 R. P. M.

The motor receives power from a pair of full-wave thyratron inverters 7 and 8, which are coupled, respectively, with two-phase input leads 9 and 10 through suitable output coupling networks 11 and 12. For the operation of the motor at the speeds referred to, a frequency of from 500 to 1700 cycles is applied to the full-wave thyratron inverters 7 and 8 from a variable frequency sine-wave oscillator 15, having a variable frequency control network 16 by which the frequency is adjusted for the desired motor speed; that is, for the excitation or triggering of the full-wave thyratron inverters, through manipulation of controls 77 and 78.

An amplitude limiter circuit 17 is arranged in connection with the oscillator for preventing excessive voltage generation at the high frequency end of the frequency control range of operation of the oscillator, and a feedback stabilizer circuit, indicated at 18, is connected with the oscillator for maintaining the feedback at a relatively low value at all frequencies, thereby to provide an approximate sine-wave shape with a minimum of distortion.

A low pass filter and amplifier 20 is arranged to receive the output from the oscillator and to pass the highest operating frequency, which in the present example is 1700 cycles. By this means, any harmonics which normally would be amplified and passed on to the phase-shift network are suppressed, so that only a pure sine wave at the desired frequency is derived from the oscillator. This circuit may also be adapted for amplifying the output voltage derived, so that it is restored to its original value after passing through the filter.

A resistance-capacitance two-branch voltage divider or phase-shift network 21 is arranged to receive the output of the low pass filter and to divide the sinusoidal output voltage into two separate and corresponding voltages or voltage components, one of which lags in phase from the original voltage by 90 degrees. This is applied to a voltage equalizer amplifier 22, while the other leading or in-phase component is applied directly to a phase-inverter means or amplifier stage 23. Since the voltage applied to the voltage equalizer 22 from the lagging phase varies widely in amplitude with frequency change, the equalizer includes gain control means whereby the lagging voltage component is automatically regulated to equal the amplitude of the leading phase at all adjustments of the frequency. The output voltage is then applied to a second phase-inverter means or amplifier stage 24 in a separate control channel.

The phase-shift network 21 and voltage equalizer amplifier 22 serve to provide, at the phase inverter stages 23 and 24, a two-phase voltage, that is, two sine-wave voltages, 90 degrees out of phase, which are substantially equal in both phases. As indicated, the phase inverter stages 23 and 24 are the initial stages, respectively, of the two-phase branches or control channels, and may be referred to as phase A and phase B, as hereinbefore noted.

The two-phase voltages derived from the phase-inverter stages 23 and 24 are balanced or push-pull voltages in each phase and are of sufficient amplitude for operating the following push-pull wave-shaper amplifier stages 25 and 26, respectively. These amplifiers are provided by suitable electronic tube means, so biased that the balanced sinusoidal input wave on each stage produces a balanced output wave-form for each of the two phases that is of a predetermined pulse shape, each pulse being less than one-half cycle in width or duration and of suitable amplitude for effectively controlling a thyratron power circuit or thyratron inverter of the type indicated at 7 and 8 for motor control purposes. In order to preserve the pulse shape and properly to apply the pulses to the full-wave thyratron inverters 7 and 8, a push-pull impedance coupling network is provided between each push-pull wave shaper amplifier and the following full-wave thyratron inverter, as indicated at 27 and 28.

In the high frequency control system shown, the frequency of the sine-wave output signal from the oscillator may be varied or adjusted by means of the frequency control network. The output signal at the established frequency is passed through the low pass filter and amplifier 20, thence through the phase-shift network 21 to the phase-inverter stage 23 directly in the phase A channel, and through the voltage equalizer 22 to the phase inverter stage 24 in the phase B channel.

The sine-wave output signal is then applied in push-pull through the inverter stages 23 and 24 to the push-pull wave-shaper amplifiers 25 and 26, and thence through the coupling networks 27 and 28 to the triggering circuits of the full-wave thyratron inverters 7 and 8, thereby controlling the power output to the two-phase motor 5 through the two-phase output coupling networks 11 and 12. The high speed tool 6 then operates at the selected speed as determined by the frequency setting of the oscillator frequency control network 16, and the adjustment of the output coupling networks 11 and 12 through the coupling connection 80 with the control knob 77.

A more comprehensive study of the system is provided by reference to Figure 2, along with Figure 1, in which the complete circuit details of the system of Figure 1 are shown.

Referring now to Figure 2, along with Figure 1, in which like elements are designated throughout by the same reference characters, the oscillator 15 comprises an electronic oscillator tube 30, which may be one triode section of a suitable 6SN7 double triode. An LC tank circuit is used in a Hartley type of oscillator, comprising a main inductance having a grid section 31, an anode section 32, and a frequency control network 16 connected therewith through leads 33 and 34, the latter being connected to the ground lead 35 for the system.

One terminal 36 of the inductance 31—32 is connected to the ground lead 35, while the opposite high potential terminal 37 is connected with the lead 33, and with a lead 38 terminating in the anodes 39 of a rectifier tube 40 in the amplitude limiter circuit 17. The lead 38 is also coupled to the control grid 46 of the oscillator through a grid capacitor 41 and a grid-leak resistor 42 of relatively low resistance value. The latter is connected to the cathode tap 43 on the tuned inductance 31—32, along with the cathode 44, in circuit with which is provided a cathode resistor 45 for applying degeneration to the oscillator for smoothing the operation thereof, and helping to eliminate any tendency to block.

The oscillator anode 47 is connected through a feedback stabilizing circuit, comprising a series resistor 48 and a series capacitor 49, with the terminal 36 and ground. Oscillator anode potential is supplied from a positive anode supply lead 50 through a coupling resistor 51. The resistor 48 in the anode circuit connection with the inductance 31—32, by way of the capacitor 49 and the terminal 36, serves as a stabilizer to maintain the feedback at a predetermined relatively low level and permits the oscillator to operate over a wide frequency range without blocking at either end of the range. The bias or cathode resistor 45, also effectively in circuit with the anode, provides a biasing potential which also aids in stabilizing the operation of the oscillator at all frequencies, and with the feedback stabilizer tends to produce a smooth sine-wave voltage output which has been found to be desirable as a base for two-phase or other polyphase signal generation.

The oscillator signal output voltage is taken from a terminal 43 or cathode connection on the oscillator, or tuning inductance, through the low pass filter 20. A coupling capacitor 52 is connected serially between the terminal 43 and the filter which comprises a limiting resistor 53 and a tapped resistor 54 in series to ground, with a shunt capacitor 55 connected with the resistor 54. A tap connection 59 on the resistor 54 serves to determine the oscillator output potential to be applied through an output lead 56 to the control grid 57 of a buffer amplifier electronic tube 58, and is adjusted to give the optimum range of operating voltages to the voltage equalizer amplifier 22 and a control grid therein. The gain of the amplifier tube 58 serves to restore the voltage loss in the low pass filter at certain frequencies. Like the oscillator and other tubes, it may be provided by one section of a standard commercial 6SN7 tube.

The oscillator peak voltages are limited in amplitude by means of the limiter circuit 17. This includes a rectifier tube 40 and a series resistor 61 connected in the cathode circuit 62 of the rectifier, and is completed through a capacitor 63 to the ground lead 35 and the terminal 36 of the oscillator tank circuit. Thus the rectifier 40, the resistor 61 and the capacitor 63 are serially connected across the oscillator tank circuit between the terminals 36 and 37.

The damping or limiting action of the resistor 61 on the circuit is adjusted for the same amplitude of oscillations at the high frequency end of the range as at the low frequency end, by adjusting the positive bias on the rectifier cathodes through connection of the cathode circuit lead 62 with an adjustable contact 65 on a bleeder resistor 66, which is connected in a voltage bleeder circuit between the high positive anode supply lead 50 and ground 35. A series voltage dropping resistor 67 is provided to limit the voltage adjustment range of the contact element 65—66, which regulates the positive bias on the cathode circuit of the rectifier 40. When the established bias voltage is exceeded, the rectifier breaks down and applies the resistor 61 across the tank circuit, limiting the high amplitude peaks which may occur in operation, particularly at the high frequency end of the tuning range.

The frequency of the oscillator is variable by means of a four-gang variable capacitor comprising elements 70—73 inclusive, provided with suitable trimmer capacitors 74 and series tracking capacitors 75, and further being selectively connectable in circuit through a four-step tap switch 76. The tap switch is operated by a control knob indicated at 77, while the four-gang capacitor is operable by a second variable control knob 78, providing, respectively, frequency range and variable frequency control of the oscillator. As will be seen from an inspection of the circuit connections, the four-step, three-pole tap switch 76 provides for successively and selectively connecting the capacitors 70—73 in circuit across the main inductance 31—32, between the leads 33 and 34.

The four-step frequency range control for the oscillator is representative of any suitable number of frequency ranges to be selected for any given installation or operation. In the present example, for the operation of high-speed grinding tool motors within the speed ranges hereinbefore referred to, the four steps provided in connection with the switch 76 may be considered to provide the following frequency ranges, each of which is variable by means of the control knob 78 between the limits indicated:

| Step | Speed | Frequency in C. P. S. | R. P. M. (Synchronous) |
|---|---|---|---|
| 1 | High | 1,300–1,700 | 78,000–102,000 |
| 2 | Intermediate | 1,000–1,300 | 60,000–78,000 |
| 3 | Medium | 700–1,000 | 42,000–60,000 |
| 4 | Low | 500–700 | 30,000–42,000 |

This provides a range of speed from 30,000 R. P. M. to 102,000 R. P. M. for a two-pole induction motor, when connected with a suitable thyratron power supply system.

It will be noted that the frequency range control means may provide for adjustment of other portions of the power supply system in certain cases, as indicated by the dotted line connection 80 leading to the inverter output circuits. For example, as indicated by the legend, this connection may serve to control means whereby the thyratron inverter stages 7 and 8 are conditioned for operation in each of the various frequency ranges with maximum efficiency. An arrangement of controls for this purpose may include a thyratron commutation or quenching control as may be desirable for wide frequency range of operation. However, this connection may be used for other purposes, for adjusting various circuit means in connection with the speed range control, and as the specific connection to other portions of the system, except as above, does not concern the present invention, further description is believed to be unnecessary.

The four-step range control for the oscillator frequency is representative of any desired number of frequency steps which may be provided for the sine-wave oscillator, and likewise the overall frequency range may be modified or extended, or the frequency may be fixed at one or more predetermined values in accordance with the requirements for any particular frequency supply for control purposes. However, the present four-step speed range control is shown for the reason that it is particularly well adapted for the excitation of thyratron inverters for variable speed alternating current industrial motors for high-speed operation.

The four-gang variable frequency control system, comprising the capacitor sections 70—73 and the tracking capacitor network in connection therewith, also represents a present preferred arrangement for speed variation through each speed range, although other suitable means may be provided, and in some instances the variable speed feature may be eliminated where the motor speed, for example, is to be adjusted in successive predetermined steps only, or fixed at one speed.

While a stabilizing Hartley type oscillator, as shown, is presently preferred, any suitable LC type stabilized tuning system, or any other stable sine-wave source, may be utilized. Likewise, oscillation peak limiting is desirable as provided by the series rectifier and resistor peak limiter circuit across the main oscillator tuning inductance, in the present example, with threshold adjustment for the operation of the rectifier. This circuit operates to preserve the wave form at high frequencies in that the oscillator peak voltages are suppressed thereby, and the feedback stabilizer circuit, comprising the series resistor 48 and the capacitor 49 in the anode return circuit to the oscillator tuning inductance, serves to preserve the sine-wave output form of the signal voltage delivered by the oscillator at all frequencies. It will be noted that this feedback stabilizer circuit is not in the main LC circuit of the oscillator, and thus serves to control the feedback to a sufficient value to maintain the oscillations at all frequencies within the desired operating range without interfering with frequency adjustment of the control network.

To further preserve the wave shape and to prevent harmonics from being delivered to the output circuit of the oscillator and to the phase-divider network in accordance with the invention, the low pass filter circuit, comprising the resistors 53, 54 and the capacitor 55, is provided in the output lead 56, so that the control grid 57 of the buffer amplifier 58 receives only sine-wave oscillations, below 1700 cycles in the present example. The use of the low pass filter aids in obtaining a clean sine-wave output and thereby aids in attaining a balanced voltage output through the phase shift network which follows the buffer amplifier in the output circuit of the oscillator.

The phase shift network comprises two circuits or branches connected in parallel across the buffer amplifier output circuit comprising an anode lead 82 and the ground lead 35. One branch of the circuit comprises a resistor 83 and a capacitor 84, in series, in the order named, from the lead 82 to the ground lead 35, whereas the second branch includes a capacitor 85 and a resistor 86, also in the order named, between the leads 82 and ground 35. An output tap connection 87 between the resistor 83 and the capacitor 84, and a second output tap connection 88 effectively between the capacitor 85 and resistor 86, provide a two-phase output connection for the oscillator. The tap connection 88 is in the form of a potentiometer contact operative in connection with the resistor 86, which is a potentiometer resistor. The values of the capacitors 84 and 85 are the same and equal, and may be considered to be of the order of .1 mfd., while the resistors 83 and 86 are likewise equal, and each may likewise be of the order of 100,000 ohms in the present example.

The oscillator output voltage is applied to the two parallel resistance-capacitance voltage dividers above described, through the circuit 82—35 across the anode coupling resistor 89, which is connected with the anode lead 82 and a filter resistor 90 in the positive anode supply lead 50. The filter resistor is provided with a suitable by-pass capacitor to ground, indicated at 91.

The in-phase or leading phase voltage, which may be referred to as the phase A voltage, is derived from the potentiometer contact or output tap connection 88, while the out-of-phase or lagging phase voltage derived from the terminal or output tap connection 87 at the junction of the resistor 83 and the capacitor 84, being the phase B voltage, lags 90 degrees in phase from phase A. This 90-degree phase difference is the result of using identical resistance and capacity values in the two parallel resistance-capacitance dividers in reverse order, as described. Thus, the alternating currents through the two divider circuits are identical, both in phase and magnitude, for all frequencies of operation, so that the alternating current output voltage across the capacitor 84 inherently differs in phase by 90 degrees from the corresponding output voltage across the resistance of the potentiometer 86.

Broadly, this result is obtained for any parallel set of dividers having the same ratios of resistance to reactance. However, identical values of resistance and capacitance seem most practical.

The magnitude of the phase B voltage at the output terminal 87 varies substantially inversely with frequency, while the magnitude of the phase A voltage at the output terminal 88 is substantially constant for all frequencies. In order to eliminate the complications of manually adjusting the phase B voltage to equal the phase A voltage for different oscillator frequency adjustments, and automatically to equalize phase A and phase B voltages during changing oscillator frequency or speed change adjustments, an equalizer circuit is provided for the output circuit of the oscillator, and is located in the phase B branch of the phase shift network.

The equalizer circuit comprises a variable gain amplifier stage including an electronic amplifier tube 93, to the control grid 94 of which output signals from the phase B terminal 87 of the phase shift network are applied through an output lead 95 and a coupling capacitor 96. The grid 94 is provided with a grid resistor connection 97 with the ground lead 35, and the cathode 98 of the amplifier tube 93 is connected likewise to ground, through a self-bias resistor 99 provided with a suitable bypass capacitor 100. Thus the grid 94 is self-biased.

The tube 93 is provided with a screen grid 102, which is energized through a filter network from the positive anode potential supply lead 50 comprising a series of voltage bleeder resistors 103—107 inclusive, with an intermediate tap connection at 108 for the coupling resistor 109 for the grid 102. Thus the screen grid is provided with a normal positive potential which is substantially lower than the potential at the lead 50 by the amount of the drop in the bleeder resistor sections 103 and 104. A bypass capacitor 110 is provided for the first bleeder resistor section 103, and likewise the screen grid 102 is bypassed to ground through a suitable bypass capacitor 111.

The amplifier tube 93 is provided with a suppressor grid 115, to which is applied a variable gain controlling potential responsive to the applied signal wave and derived through a signal rectifier tube 116 and a signal amplifier tube 117 coupled through a coupling capacitor 118 with the phase B output lead 95. This serves to couple the control grid 119 of the amplifier tube 117 with the lead 95, whereby the tube 117 amplifies the oscillator signals applied thereto through phase B. The rectifier 116 is coupled to the amplifier tube through an output coupling network comprising an anode or plate resistor 120 in the anode circuit 122 of the tube 117 and a coupling capacitor 121 through which signals are applied to the anodes 123 of the rectifier 116.

The rectifier is provided with an output circuit lead 124 connected between the rectifier anodes 123 and the cathode 98 of the variable gain control amplifier 93, through a series potentiometer resistor 125. The suppressor grid 115 of the tube 93 is connected to an adjustable tap 126 on the potentiometer resistor 125 through a coupling resistor 127, and the grid 115 is suitably bypassed to ground through a bypass capacitor 128. The cathodes 129 of the rectifier 116 are likewise connected in parallel and to an adjustable contact 130 on a potentiometer resistor 106.

A bypass capacitor 131 is connected between the rectifier cathodes 129 and ground, provided at the terminal 132. It will be noted that the grid 119 of the amplifier stage 117 is connected to ground through a grid coupling resistor 133, and is suitably biased through a cathode resistor 134. Any suitable electronic amplifier may be utilized to provide amplified signals for the rectifier 116, which likewise may be provided by other suitable means than the double diode shown.

Thus the control grids of the gain controlling stage 93 and of the amplifier tube 117 are connected in parallel to the phase B output voltage source 87. The tube 93 is of the pentode type, provided, for example, by a commercial tube known as type 6AS6, the suppressor grid of which provides the gain control element. The tube 117 is likewise of the pentode type, such as a commercial type known as 6AU6, but is operated as a triode amplifier for amplifying the phase B voltage for subsequent rectification by the rectifier 116.

With the present arrangement, the potentiometer resistor 125 is effectively connected in shunt across the rectifier 116, and in response to signals through the amplifier 117 and the rectifier 116, it will be seen that an increasing negative bias will be applied to the suppressor grid 115 as the signal amplitude increases, this potential being with respect to the cathode 98. The cathode 98 may be at any predetermined positive potential with respect to ground as determined by the cathode resistor 99. It is for this reason that the potentiometer resistor 125 and the rectifier output circuit therethrough is connected directly to the cathode 98, so that the bias on the grid 115 is always independent on the bias on the control grid and the drop in the cathode resistor 99. The negative bias voltage produced by the rectifier 116 is applied to the suppressor grid 115, through the potentiometer 125 and the resistor 127, and the capacitor 128 acting as a filter.

The potentiometer contact 130 is so adjusted that a threshold bias is applied to the rectifier 116, whereby it starts to rectify when the signal potential in the output circuit 95 attains a predetermined minimum value, as at the high frequency end of the tuning range of the oscillator. As the frequency of the oscillator is decreased in operation, in controlling the speed of the motor or other utilization means connected with the system, it will be seen that the voltage across the phase shift network capacitor 84 will increase as the impedance of the capacitor increases with decrease in frequency, thereby applying a higher signal potential to the amplifier 117 and the rectifier 116, and resulting in an increasing negative bias across the potentiometer 125 after the initial or threshold bias on the rectifier is overcome. This, in turn, increases the biasing potential on the grid 115 and tends to reduce the gain of the amplifier 93 accordingly in proportion, thereby to maintain the signal output therefrom substantially constant in amplitude.

After initial adjustment, the gain of the amplifier 93 is caused to vary inversely with the amplitude of the phase B voltage, so that the output of the tube 93 produces substantially a uniform voltage level which is the phase B inverted, that is, leading phase A. The gain of the voltage equalizer amplifier 93 is initially set so that the phase B voltage output is equal to the phase A voltage output at the terminal 88 at the highest frequency of adjustment of the oscillator, the output potential for the phase B branch now appearing at an output terminal 140 on the anode output circuit 135 across the anode coupling resistor indicated at 136.

The positive supply end of the resistor 136 is connected to a terminal 137 between the resistors 103 and 104 in the bleeder system. Thus the anode 138 receives a higher positive potential than the screen grid 102 for proper operation of the tube.

Therefore, at the anode end of the coupling resistor 136, or at the phase B terminal 140, the output voltage for phase B is caused to equal the output voltage for phase A at the output terminal 88 and is leading because of the amplifier stage 93. These terminals are then coupled to separate amplifier stages in the now separated amplifier or signal conveying channels for both phases. At these points, namely, output terminals 88 and 140, phase A and phase B may be individually considered, in effect, as single phase, so that the voltages at these two terminals, with respect to ground, although 90 degrees out of phase, are substantially separate, equal, single-phase, pure sine-wave voltages.

These voltages are necessarily inverted for push-pull operation of the polyphase thyratron inverter stages in a system of power supply in accordance with the invention, and the inversion may be accomplished by inverter amplifier tube means as in the present Figure 2, or by means of coupling transformesr for converting from single phase to push-pull as in the circuit of Figure 3, as will be described hereinafter.

In the present example, the phase-inverted voltage-gain stages 23 and 24 comprise two electronic amplifier tubes 142 and 143, respectively, having control grids 144 and 145, coupled respectively to the input terminals 88 and 140 for phases A and B. Both amplifier tubes are self-biased as indicated by the cathode resistors 139 and 157, and the grid 144 is coupled to the terminal 88 through a suitable coupling capacitor 141, while the terminal 140 is coupled to the grid 145 through a suitable coupling capacitor 146.

Both tubes 142 and 143 may be provided by two sections of a commercial type 6SN7 tube, and are operated with the cathodes above ground potential through the medium of coupling resistors 147 and 148, providing output coupling terminals 149 and 150, respectively, for the tubes 142 and 143. Likewise, in the anode circuits 151 and 152, output terminals 153 and 154, respectively, are provided with respect to output anode coupling resistors 155 and 156, thereby providing a well known form of phase inverter amplifier tube circuit in each channel, to which output push-pull connections may be made in each case. Such a coupling arrangement is relatively simple, and by proper choice of resistors in the cathode and anode circuits, the output voltage at terminal 153 may be made equal to the output voltage at terminal 149, being 180 degrees out of phase, or push-pull, as are the voltages at the terminals 150 and 154 in channel or phase B.

Furthermore, in accordance with the invention, the push-pull sine-wave voltages provided in each of the two-phase channels are now shaped for application to, and for most effective control of, full-wave thyratron inverter power circuits. The wave shaping is accomplished by means of the push-pull wave-shaper amplifiers 25 and 26, referred to in Figure 1. These are provided in the present example by suitable electronic amplifier tubes 158 and 159 in channel A, and 160 and 161 in channel B, together with proper control circuits. These tubes may likewise be provided by commercial double triodes of the 6SN7 type, one tube providing the triodes 158 and 159 in channel A, and the other tube providing the triodes 160 and 161 in channel B.

The input circuits of the tubes 158 and 159 are connected in push-pull relation across grid coupling resistors 162 and coupled to the terminals 153 and 149, respectively, of the preceding phase inverter amplifier 142, suitable coupling capacitors 163 being provided for each tube. A tap connection 165 between the resistors 162 is connected with a bias potential supply lead 166, which in turn is connected through a filter comprising a shunt capacitor 167 and series resistor 168, with a bias potential supply terminal 169 on a plate supply and bias circuit 170.

In a similar manner, the tubes 160 and 161 are coupled across grid resistors 171 and 172 with the terminals 154 and 150, respectively, of the preceding phase inverter amplifier 143, suitable coupling capacitors 173 being provided for each tube. It will be noted that the above described crossover coupling connections in phase B channel correct for the phase inversion in amplifier 93, in restoring phase B as the lagging phase.

A tap connection 174, between the resistors 171 and 172, is connected through a bias supply lead 175 with the lead 166 and the filter 167—168, whereby a predetermined negative biasing potential is applied to the tubes 158—161 from the supply terminal 169 with respect to ground. It will be noted that the cathode leads 177 and 178 for the push-pull connected tubes 158—159 and 160—161 are connected to ground lead 35 at the terminal indicated at 179.

The circuit arrangement for the bias supply, as will hereinafter be more fully described, provides for applying to the control grids 180 of the tubes 158—161, inclusive, with respect to the cathodes, a biasing potential such that the anode current of the tubes is reduced well below cut-off, thereby preventing the tubes from amplifying any signals below a predetermined minimum amplitude and serving to cut off the peaks and reduce the width of the sine input wave indicated by the voltage-wave curve diagram 181, for producing a corresponding pulse wave.

The output anodes of the tubes 158 and 159 are coupled through a push-pull output anode circuit 182—183 across a balanced-output impedance-coupling network comprising a balanced, or center-tapped, coupling inductor or inductance element 184 and output coupling capacitors 185 connected to output leads 187 and 188. The latter are connected through a suitable plug connector, indicated at 189, with terminals 190 and 191 for a balanced, center-tapped output resistor means comprising resistor sections 192 and 193. The junction or tap connection on the resistor means, between the resistor sections 192 and 193, is provided by a terminal 194 connected through a lead 195 and the plug connector 189 to a bias supply lead 196 terminating at an adjustable contact 197 in the plate supply and bias circuit 170. This terminal is adjustable to provide a predetermined negative bias on the terminal 194 with respect to ground, for the control of the thyratron stage 7 representing the utilization circuit for the output of channel or phase A.

The output wave derived from the wave shaper amplifier stage 158—159 through the output leads 187 and 188 will have a sharply peaked form, as indicated by the wave curve 199. This is determined by the anode potential applied to the tube and the bias potential adjustment at the terminal 169. This is adjusted to reduce the anode current to a value below cut-off so that only the peaks of the sine-wave input appear in the output as narrow pulses of less width than one-half the sine-wave form from which it is derived. The amplitude of the pulses is relatively high, being of the order of 125 volts peak with 10 volts input at the grid 144 of the phase inverter stage 142, that is, from the output terminal 88 of phase or channel A.

It has been found that this sharply peaked, high-amplitude pulse wave is readily adapted to trigger or excite thyratron inverters using grid-controlled, gaseous discharge electronic tubes of the type shown at 7 and 8, and is an important factor in attaining sufficiently rapid firing and deionization to permit full power to be derived therefrom at high frequencies of the order of 2000 cycles and higher, without reducing the useful tube life.

The channel or phase B output coupling connections are similar. The wave-shaper amplifier tubes 160 and 161 are provided with output anode circuits 200 and 201, across which is connected an output coupling impedance comprising a center-tapped inductance element 202 and is provided with output coupling capacitors 203, thereby providing push-pull output connections for output leads 204 and 205 which extend through the output coupling plug connector 189 and connect with terminals 206 and 207 for a pair of series-connected output coupling resistors 208 and 209 having a common or center-tap terminal 210 which is connected through a lead 211 with the lead 195, in the same manner as for the terminal 194.

With this arrangement, the exciter voltage output terminals 190 and 191 are connected in balanced or push-pull relation with the output anode circuits 182 and 183, respectively, for the wave-shaper stage comprising the push-pull connected tubes 158 and 159, while the exciter voltage output terminals 206 and 207 are connected in balanced or push-pull relation with the output anode circuits 200 and 201, respectively, for the wave-shaper stage comprising the push-pull connected tubes 160 and 161.

Thus there is provided, in connection with the oscillator, a two-phase or dual channel, push-pull output connection providing substantially equal push-pull voltages for control purposes, the control voltages being suitably amplified, peaked and reduced in width and adapted for controlling by pulses any utilization means such as the thyratron inverter stages 7 and 8 of the present example.

The thyratron inverter stages shown comprise a pair of push-pull thyratron inverters 215 and 216 in phase A, and 217 and 218 in phase B, with grid circuits 220 and 221 connected through suitable series limiting resistors 219 with the terminals 190—191 and 206—207, respectively, so that the resistors 192—193 and 208—209 form part of the grid circuit for the thyratrons and the grids are therefore biased negatively with respect to the cathodes, through the bias supply terminal 197 in the plate supply and bias circuit 170. This provides a separate bias potential source for the thyratron apart from the plate supply (not shown). The cathode supply circuit leads are indicated at 224, and one of the cathode connections is grounded, as indicated at 225, by means of an extension of the ground lead 35 through the plug connector 189.

The plate supply and bias circuit included in the exciter system may include the usual full-wave rectifier comprising an electronic rectifier tube 230, connected to the plate supply secondary 231 of a power supply transformer 232, the primary 233 of which is energized from supply leads 234 provided with a connection through the plug connector 189 with power supply leads 235 in the thyratron power output unit. The center tap 237 on the secondary 231 is connected through a lead 238 and a pair of potentiometer resistors 239 and 240 in parallel, with the ground lead 35, the return connection to the ground lead being made through a lead 242. This is the negative side of the supply.

The positive side of the plate supply is taken from an output cathode terminal 243 and a supply lead 244 connected with the supply lead 50 through a filter comprising a series filter resistor 245 and a shunt filter capacitor 246. Suitable filter capacitors 248 are provided in the plate supply circuit, and the bias supply arrangement is such that the bias supply terminals 169 and 197 are relatively negative with respect to the ground lead by an amount determined by the tap connection. In the present example, 100 volts negative bias may be provided at the tap 197, while 18 volts negative may be provided at the tap 169. The filament supply secondary for the tubes in the voltage wave supply system is indicated at 250, and is provided with a center tap connection 251 to the ground lead 242.

Referring to Figure 3 along with the preceding figures, a modification of the circuit of Figure 2 is provided in the interstage coupling between the phase shift network 21 and the push-pull wave-shaper amplifiers 25 and 26, whereby transformer coupling may be used to obtain both the phase inversion from single-ended to push-pull, and a relatively high voltage gain for driving the push-pull wave-shaper amplifiers which follow in each phase or channel.

In addition, the circuit of Figure 3 provides means for applying to the thyratron circuit a separate series of positive voltage pulses for each thyratron control grid, and from which all of the negative pulses are eliminated. Thus in the two-phase system shown, the pulses applied to phase A are 90 degrees in advance of the pulses applied to phase B and the tubes 158—161, inclusive, are triggered at 90-degree intervals and in predetermined time phase relation to produce a series of output pulse waves that are applied to the thyratrons 215—218, inclusive, without the negative half waves.

The system for producing this result includes, in Figure 3, the phase inverter amplifier stages comprising the tubes 142 and 143 coupled, respectively, to the phase shift network and to the voltage equalizer amplifier as indicated. As hereinbefore stated, the phase-inverter amplifier tubes 142 and 143 are transformer-coupled to the push-pull wave shaper amplifiers 158—161, inclusive, through the medium of interstage push-pull coupling transformers 260 and 265. The transformer 260 is provided with a center-tapped balanced secondary 261, the terminals of which are connected with the control grids 180 of the wave shaper tubes 158 and 159 in phase A channel, while the transformer 265 is provided with a center-tapped balanced secondary 266, the terminals of which are connected with the control grids 180 of the wave-shaper tubes 160 and 161 in phase B channel. The primaries 263 and 268 of the transformers 260 and 265, respectively, are connected in the respective anode circuits 270 and 271 of the amplifier tubes 142 and 143, and both anode return circuits are connected with the positive supply lead 50.

The tubes 142 and 143 are self-biased through the usual cathode resistor means 273 and 274, provided with suitable bypass capacitors 275, and the control grids 144 and 145 are returned to the ground lead 35 through suitable grid resistors 276. It will be understood that at the terminals 278 and 279, being input terminals for the grids 144 and 145, respectively, in the present example, the voltages supplied by the preceding portion of the exciter system hereinbefore described are equal and 90 degrees out of phase.

The voltages applied to the grids 180 of the wave-shaper tubes 158—161, inclusive, here shown as separate triodes, as may be desirable with cathode coupling, depend upon the voltage step-up ratios of the transformers 260 and 265, which are made substantially equal and provide on the grids of the tubes 158—161 relatively high peak sine-wave voltages. Ratios of the order of 1:3 step-up have been found to be suitable in the circuit shown.

The cathodes 282 and 283 of the tubes 158 and 159 are connected through cathode resistors 284 and 285 with a terminal 286, which is biased negatively with respect to ground by an amount equal to the bias required for the driven or excited thyratron inverter stage which follows, comprising the tubes 215 and 216 in the present example. It will be noted that the grids 290 and 291 of the thyratron tubes 215 and 216 are coupled directly with the cathode terminals 288 and 289 through conductive circuit leads 292 and 293 and the series limiting resistors 219, thereby providing a direct cathode coupling output connection for the tubes 158—159 with the thyratron grids 290—291 through which a D.-C. biasing potential may be applied to both of the latter grids.

For independently biasing the grids of the wave-shaper tubes 158—159, it will further be noted that the center tap 295 on the secondary 261 is connected with the terminal 286 through a biasing resistor 296, shunted by a suitable bypass capacitor 297. The resistor 296 may have a value of 100,000 ohms, while the bypass capacitor may have a value of .5 mfd. for triode tubes shown, and likewise the resistors 284 and 285 in the cathode circuits may each have a value of 51,000 ohms in the system shown, being therefore of relatively low resistance and impedance for coupling over to the thyratron stages.

In a similar manner the cathodes 300 and 301 of the tubes 160 and 161 in phase B channel are connected through cathode resistors 302 and 303 with a center terminal 304, which in turn is connected with the center tap 305 of the push-pull secondary winding 266 of the input transformers 265 through a series biasing resistor 307 shunted by a bypass capacitor 308, both of which have the same values as in the corresponding stage for channel A above described, and also the resistors 302 and 303 may have values of 51,000 ohms as in the corresponding stage for the phase A circuit.

Also, as in the case of phase A, cathode terminals 310 and 311 for the cathode resistors 302 and 303, respectively, are conductively connected directly through leads 313 and 314 with the control grids 315 and 316, respectively, of the thyratrons 217 and 218 in the phase B power control circuit, series limiting resistors 219 being included in each lead.

The terminal 304 is connected through a tie-connection lead 318 with the terminal 286 and is also connected through a lead 320 with a source of biasing potential (not shown) for applying thereto, with respect to ground 35, the maximum rated negative bias potential for the thyratrons 215—218, inclusive, thereby to permit the minimum deionization time in the operation of the thyratrons, for reasons which will hereinafter appear.

It will also be noted that the primary winding 268 of the transformer 265 is normally reversed in its connection in the anode circuit 271 to restore the phase B to a lagging relation with respect to phase A, since the voltage equalizer amplifier, as hereinbefore noted, inverts, or changes by 180 degrees, the phase relation between the two channels, which, however, has no effect upon the operation of the polyphase output power circuits controlled by the power supply system in any case. A double-pole, double-throw switch 322 may be introduced in the connections to the primary winding to shift phase B as a convenient means of reversing the rotation of a motor in the power output circuit, as the switch may be light and inexpensive, since it handles negligible power.

It will further be noted that the anodes 325 of the wave-shaper amplifier tubes 158—161, inclusive, are all connected with a common anode supply lead 326, which in turn is connected at a terminal 327 with the positive potential supply circuit 244. This for the reason that the output signal coupling is made in connection with the cathode circuits, as previously described.

It will also be noted that, in showing the connections between the push-pull wave-shaper amplifiers and the thyratron inverter stages, the connector plug arrangement has been omitted for the purpose of simplifying the drawing and for aiding in an understanding of the operation of the circuit, although it should be understood that some form of plug connection may normally be made between the exciter system and the utilization circuit, represented by the thyratron inverter, as in the case of Figure 2.

Between the leads 292 and 293 for phase A, and between the leads 313 and 314 for phase B, representing the output circuits of the two phases, is shown a pulse-wave time relation diagram or graph indicating the voltage pulses in their time-phase relation as they appear on the output leads and as they are applied to the thyratrons. As indicated, a sharp positive pulse 330 is applied to the lead 292 and the thyratron grid 290, followed on the next quarter-period, by a similar sharp positive pulse 331 in phase or channel B, through the output lead 313, and being applied to the grid 315. This is followed after 90 electrical degrees, or on the next quarter-period, by a sharp positive pulse 332 through the output lead 293, and this is applied to the grid 291, and 90 degrees, or a quarter-period later, a similar pulse 333 is applied to the grid 316 through the output lead 314, whereupon the cycle repeats as indicated by the pulse wave 334, which is applied to the grid 290 through the output lead 292 90 electrical degrees later.

From the foregoing description it will be seen that the thyratrons are pulsed alternately in each phase, 180 degrees apart, in the normal push-pull relation and that the pulses in phase B lag the pulses in phase A by 90 electrical degrees or one-quarter period, thereby producing in the output circuits of the thyratrons (not shown) a two-phase output power supply controlled in frequency by the exciter system of the present invention.

The circuit of Figure 3 has not only the advantage that transformer coupling may be used, but also, as indicated by the pulse wave diagram, only positive pulses are applied to the thyratrons, since negative pulses are suppressed by reason of the direct connection to the cathodes of the push-pull wave-shaper amplifiers, and because the wave-shaper amplifiers are operated below cut-off by means of the grid current bias provided by the resistors 296 and 307, so that only the peaks of the sine-wave input wave 181 appear in the output circuit, the negative half waves being eliminated. This latter feature permits the maximum rated negative bias to be applied continuously to the thyratron inverter tubes, which is not the case when the negative half waves are present as in the circuit of Figure 2. Therefore, the thyratron triggering or exciter system embodying the modification of Figure 3 provides the possibility of operating the thyratrons at relatively high frequencies, because the deionization time is reduced to a minimum by the presence of the maximum negative bias, and this may be done without danger of reducing the tube life through malfunctioning or improper grid loading, or excessive bombardment of the grid by positive ions.

The use of transformer coupling into the push-pull wave-shaper amplifier is permissible in the high frequency control system of the present invention, for the reason that the voltage wave at that point is still a sine-wave, for which an inexpensive transformer may be designed to provide coupling without distortion.

The use of transformers for coupling into a push-pull wave-shaper amplifier may be desirable, as the number of tubes is reduced. In some instances the use of phase-inverter electronic amplifier tube stages may be desirable, where the push-pull balance, or gain, is to be adjusted slightly after the apparatus is in use, for the reason that a rather high voltage is required to operate the class C stages in the wave shaper amplifiers, since they are biased well beyond anode current cut-off to produce the narrow peaked pulses for triggering the thyratron power stages which follow.

In this connection, it may be noted that an impedance coupling network is used in the output circuit of each of the push-pull wave-shaper amplifiers, rather than transformer coupling, because at this point the wave is no longer a sine wave, but is a peaked, sharp pulse, and therefore low wave distortion is provided at all frequencies. Furthermore, positive pulses without negative pulses, as produced in the circuit of Figure 3, cannot be transmitted through a transformer. If transformers are used in that output coupling of Figure 2, it has been found that sharp excitation of the transformer secondary may produce indeterminate transient voltages after the quenching point in the operating cycle of each of the thyratrons which follow in the power stages. Furthermore, the impedance coupling output or grid resistors 192—193 and 208—209 provide a critical damping load on the coupling reactors or impedances 184 and 202 so that substantially a constant high impedance is provided in the output anode circuits of the wave-shaper amplifier tubes 158—161 inclusive.

On the other hand, if the wave-shaping were accomplished at another point in the system prior to the phase division, such as at the oscillator itself or at the buffer amplifier, for example, it would not be possible to obtain identical wave shapes with varying frequency from the output of the two-phase or phase-shift network 21 if the input wave were a complex wave, as it would be under the conditions above stated. It is for the same reason that a substantially clean and perfect sine wave is provided at the phase-shift network for better phase splitting or phase shifting results. This, of course, includes the use of the low pass filter in the output of the oscillator, as well as stabilizing the limiting oscillator voltages as has hereinbefore been described.

Accordingly, it will be seen that it is desirable that the shaping of the sine wave into sharp pulse form follow the phase splitting or shifting in the two-phase network, and that for proper wave shaping relatively high voltage gain is required preceding the shaping and that this, in turn, is followed by substantially constant high impedance coupling networks for low distortion of the shaped pulse wave in its application to the utilization circuit, which generally is the thyratron inverter power handling stage of a complete power supply system for the control of high frequency alternating current motors and the like in industrial applications. For such control it is further desirable to provide a series of positive pulses while causing negative pulses to be suppressed.

Referring now to the drawings, the operation of the system is as follows: The electron tube oscillator, amplifiers and rectifiers are energized by means of the plate supply and bias circuit when connected with suitable alternating current through the supply leads 234 and 235. The oscillator range control knob 77 is adjusted to establish the desired frequency range of operation, and the frequency control knob 78 is set for the desired speed in that range.

The oscillator then applies to the buffer amplifier 58 a sine-wave voltage at the frequency selected, and suitably limited and free of harmonics, and the amplifier, in turn, delivers the sine-wave voltage to the phase shift network 21, where it is split or divided into two corresponding phase A and B voltages, the B phase voltage being further equalized by the voltage equalizer amplifier 22, so that either through the transformer coupling of Figure 3, or the electron tube coupling of Figure 2, balanced push-pull high voltage in sine-wave form is delivered to the grids 189 of the two pairs of push-pull wave-shaper amplifiers in each of the phase A and phase B controlling and amplifying channels. The sine wave, as indicated at 181 in Figure 2, is then changed to a similar wave at the same frequency which is sharply peaked and reduced in width for application to the output terminals 190—191 and 206—207, through the push-pull impedance coupling networks 27—28 and the utilization means which, in the present example, is indicated as thyratron power inverters, to which the invention is particularly adapted.

The pulsed output waves in two-phase push-pull relation may be applied to any suitable utilization means, and in particular to the control grids of balanced push-pull thyratron inverters, as shown in Figure 2, for control of a two-phase motor as outlined in Figure 1. Similar arrangements may be provided for other polyphase circuits in which the sinusoidal wave is subsequently modified to the pulse shape as described, although the two-phase method of generating the voltage is at present preferred.

A variable frequency control system, in accordance with the present invention, is therefore adapted for the control of any pulse-operated system, such as high-frequency thyratron inverter for high speed induction motor operation, and provides an improved electronic means for producing full-wave, two-phase voltages of variable frequency which is highly stabilized and adapted for this purpose. In connection with a polyphase and full-wave thyratron inverter system for the control of polyphase power, it provides a simplified and flexible substitute for known rotary power supply devices such as motor generators, dynamotors, and the like, in speed ranges above safe or practical limits for the operation of such devices.

I claim:

1. An exciter system for thyratron power inverters and the like, comprising in combination, a controlled frequency sine-wave voltage supply circuit, a phase-shift network coupled to said circuit providing two voltages of differing phase in response to an applied voltage from said source, one of said voltages being variable with frequency, equalizer amplifier means coupled to said network for deriving substantially a constant voltage output from said variable voltage and of equal amplitude with the other of said voltages, a pair of thyratron inverters, and separate channel circuit means coupled with said network and equalizer amplifier means for applying said equalized voltages to said inverters in predetermined time-phase relation.

2. An exciter system for thyratron power inverters and the like, as defined in claim 1, wherein each of said separate channel coupling circuit means includes a wave-shaper circuit for transforming the sine-wave voltages into spaced voltage pulses of predetermined polarity and amplitude.

3. An exciter system for thyratron power inverters and the like, as defined in claim 2, wherein the wave-shaper circuits provide only positive voltage pulses of relatively high amplitude, and wherein a bias potential supply circuit is provided to apply to each of the thyratron inverters a negative biasing potential of the order of the rated maximum therefor, whereby relatively high frequency operation may be attained.

4. An exciter system for thyratron power inverters and the like, comprising in combination, an electronic oscillator operable at a predetermined freqeuncy, phase-shifting voltage-divider means coupled with said oscillator for deriving therefrom a two-phase output voltage, electronic tube amplifier means providing separate channel amplification of said two-phase voltage and being biased to provide corresponding voltage pulses of less than one-half cycle duration, and an output impedance coupling circuit for said amplifier means adapted to apply said pulses to said inverters in predetermined time-phase relation.

5. An exciter system for thyratron power inverters and the like, as defined in claim 4, wherein the oscillator is provided with frequency determining control circuits, and wherein the electronic tube amplifier means in each channel includes a push-pull amplifier stage and cathode-coupled output circuits therefor, whereby only positive pulses are provided for said thyratrons in the output of each channel, thereby to permit substantially maximum rated negative bias operation of said thyratrons and effective de-ionization at relatively high frequencies.

6. An electronic high frequency thyratron inverter control system, comprising in combination, a tuned electronic-tube oscillator circuit adapted to provide substantially a sine-wave output voltage, a frequency control network in said oscillator circuit, a phase-shift network coupled to said circuit for dividing the oscillator output voltage into corresponding voltages of differing phase and providing differing output circuits therefor, phase-inversion means coupled to each of said output circuits for developing substantially equal push-pull voltages for each phase of relatively high amplitude, a push-pull electronic tube wave-shaper amplifier coupled to said last-named phase-inversion means for each phase, means for operating each of said wave-shaper amplifiers below anode current cut-off, and a push-pull impedance coupling network for each of said wave-shaper amplifiers providing a plurality of balanced output circuits for said system for the operation of controlled thyratron inverter utilization means.

7. An electronic high frequency thyratron inverter control system as defined in claim 6, wherein the phase-shift network comprises a bridge circuit having substantially equal ratios of resistance and reactance oppositely connected in each arm tending to produce a voltage output for one phase which varies inversely with frequency, and wherein a voltage equalizer amplifier circuit is interposed between an output circuit therefor and the phase-inversion means for said output circuit.

8. An electronic high frequency control system as defined in claim 6, wherein a voltage equalizer amplifier circuit is interposed between the phase-shift network and the phase-inversion means for one output circuit of said phase-shift network, and wherein the output circuits for each wave-shaper amplifier are cathode coupled, thereby to produce positive pulses to the exclusion of negative pulses for the high frequency excitation of said thyratron inverters and the like, and means for imparting a high negative bias to said output circuits which is of the order of the rated maximum for such thyratron inverters.

9. An electronic high frequency control system as defined in claim 6, wherein a voltage equalizer amplifier circuit is interposed between the phase-shift network and the phase-inversion means for one output circuit of said phase-shift network, said last-named amplifier circuit being responsive to the output voltage of said one output circuit and including a gated rectifier and a bias voltage output circuit therefor, whereby the gain is controlled, and wherein the output circuits for each wave-shaper amplifier are cathode coupled, thereby to produce positive pulses to the exclusion of negative pulses for the high frequency excitation of said thyratron inverters and the like, and means for imparting a high negative bias to said output circuits which is of the order of the rated maximum for such thyratron inverters, said last-named means including an operating voltage supply circuit for said system and a bias potential source therein connected with said output circuits.

10. An exciter system as defined in claim 6 wherein each of said wave-shaper amplifiers is provided with transformer coupled push-pull input circuits as part of said phase-inversion means and with a reversible primary connection in one transformer coupled input circuit for effecting a reversal of the phasing of said output voltages from the phase-shift network.

11. A high frequency power supply system for polyphase alternating current motors and the like, comprising a full-wave thyratron inverter adapted to be coupled with each phase thereof for applying alternating current power thereto, a power output coupling network for each inverter, a sine-wave oscillator coupled to each of said full-wave thyratron inverters for applying excitation voltage thereto in predetermined phase relation one with respect to the other, said oscillator having an adjustable frequency control network and a common control element for simultaneously adjusting the frequency of the oscillator and the output coupling network of each thyratron inverter whereby the operating speed of the motor may be adjusted, circuit means for stabilizing and limiting the oscillator output voltage, a phase-shift network coupled to the oscillator for separating the oscillator output voltage into two components differing in phase, electronic tube amplifier means providing separate channel amplification and control in the coupling between the oscillator and said inverters for separately exciting each of said inverters, and including a pair of electronic amplifier tubes biased beyond anode current cut-off for imparting a peaked pulse shape to the oscillator voltage wave, thereby to improve the excitation action on said thyratron inverters.

12. The combination as defined in claim 11, wherein each full-wave thyratron inverter is biased negatively to substantially maximum rated voltage, thereby to provide maximum deionization action in response to excitation at relatively high frequencies, and wherein the wave-shaper amplifiers in each phase are further cathode-coupled directly to the thyratron inverters, thereby to eliminate the negative half waves of each voltage pulse and to apply to said thyratron inverters only positive half-wave pulses and further to improve the efficiency of operation at said high frequencies.

13. A high frequency triggering pulse generator system for polyphase thyratron power inverters adapted for operation of high speed industrial motors and the like, comprising in combination, a sine-wave source of triggering potential having frequency control means for determining the output frequency, electronic amplifier and circuit means for modifying the sine-wave triggering potential in two separate amplifying channels to provide two corresponding triggering potentials of peaker wave form of the same frequency and to the exclusion of negative half wave peaks, a pair of cathode-coupled output circuits for each amplifying channel providing direct thyratron grid circuit connections, and bias potential supply connections through said output circuits for applying relatively high negative biasing potentials to said grid circuit connections of the order of the rated maximum for said inverters, whereby improved operation of said inverters at relatively high frequencies is attained.

14. In a high frequency alternating current power supply system, the combination with a pair of full-wave thyratron power inverters, of variable frequency excitation means therefor, comprising a tunable stabilized electronic tube oscillator for generating substantially constant-amplitude output voltages at different frequencies, a phase-shift network providing dual channel output circuits coupled to the oscillator, variable gain signal-amplitude-responsive amplifier means for equalizing the output voltage in said output circuits with change in frequency, a push-pull connected class C amplifier coupled with each of said output circuits for peaking the output voltage waves to provide corresponding pulse waves in predetermined time-phase relation, and impedance coupling means providing an output connection between each class C amplifier and one of the thyratron power inverters for applying said pulse waves thereto at the oscillator frequency.

15. In a high frequency alternating current power supply system, the combination as defined in claim 14, wherein the phase-shift network comprises a bridge circuit having substantially equal ratios of resistance and reactance oppositely connected in each arm, and wherein means are provided for applying a high negative bias through said output connection to said thyratron power inverters which is of the order of the rated maximum for such thyratron inverters.

16. An exciter system for thyratron power inverters and the like, comprising in combination, an electronic oscillator operable at a predetermined frequency and having an output circuit, phase-shifting voltage-divider means coupled with said oscillator output circuit for deriving therefrom a two-phase output voltage, electronic tube amplifier means providing separate channel amplification of said two-phase voltage and being biased to provide corresponding voltage pulses of less than one-half-cycle duration, and an output impedance coupling circuit for said amplifier means adapted to apply said pulses to said inverters in predetermined time-phase relation, and said phase-shifting voltage-divider means comprising a bridge circuit having substantially equal ratios of resistance and reactance oppositely connected in each of two parallel branches across the oscillator output circuit, one branch including a resistance element and a reactance element in series in the order named, and the other branch including a reactance element and a resistance element in series in the order named, with output terminals interposed in each branch between the resistance and the reactance elements.

17. An exciter system for thyratron power inverters and the like, comprising in combination, a sine-wave voltage supply circuit, tuning means for determining the frequency of said circuit, a single phase sine-wave voltage output circuit including a high potential lead and a common ground return lead for the system coupled to said voltage supply circuit, a phase-shift network comprising two parallel branch circuits connected between said leads providing substantially equal ratios of resistance to reactance, one branch circuit comprising series connected resistance and reactance elements in the order named and the other branch circuit including series connected reactance and resistance elements in the order named, dual channel output circuit means for deriving an output voltage across the reactance element of one branch and the resistance element of the other branch and including in each channel of said output circuit means a pair of push-pull coupled electronic tube amplifiers biased and controlled for imparting a peaked pulse shape to said voltages for improved thyratron inverter excitation, and means providing an impedance coupling output connection for each of said pulse-shaping amplifiers adapted for coupling each with a pair of balanced thyratron inverters, whereby two-phase power may be derived therefrom.

18. An exciter system for thyratron power inverter and high frequency motor control, comprising in combination, a variable frequency tunable sine-wave oscillator having a main tuning inductance, a frequency control network connected in parallel with said tuning inductance, a gated rectifier and series limiting resistor connected effectively in parallel with said tuning inductance, means for stabilizing the operation of said oscillator including a series limiting impedance in the anode circuit thereof and a cathode bias resistor, an output circuit for said oscillator including a low pass filter for frequencies below the maximum frequency to which said oscillator is tunable, a phase-shift network coupled to said oscillator output circuit for receiving the sine-wave output therefrom and comprising a pair of parallel branch reactance-resistance circuits, each having an output connection thereon for dividing the oscillator sine-wave output voltage into two sine-wave voltages of differing phase, means for amplifying and transforming each of said sine-wave output voltages into balanced push-pull voltages of predetermined amplitude, and means for modifying each of said balanced push-pull sine-wave voltages to provide corresponding peaked exciting pulses at the same frequency, a plurality of full-wave thyratron inverter power controlling circuits including a plurality of balanced push-pull input grid circuits therefor, and impedance coupling networks for applying each of said exciting pulses to said grid circuits in push-pull relation thereby to control said thyratron inverter circuits at the frequency of operation of said oscillator for the production of power corresponding thereto in frequency.

19. An exciter system for thyratron power inverters and the like, comprising in combination, a pair of exciter voltage amplifying channels, high frequency alternating current exciter voltage supply means coupled to said amplifying channels in parallel and including controlling networks for maintaining thereon sine-wave exciter voltages of differing phase and of substantially constant amplitude, phase-inverter electronic amplifier stages in each of said channels, a wave-shaper circuit coupled to each phase-inverter stage, said wave-shaper circuits each including a pair of push-pull connected electronic amplifier tubes operating beyond anode cut-off for transforming said sine-wave exciter voltages into spaced, substantially sharp voltage pulses of predetermined polarity and amplitude, an impedance-coupled output network for each of said wave-shaper circuits, and a balanced thyratron inverter coupled to each of said impedance coupled networks to receive voltage pulses therefrom in predetermined timephase relation for the generation of alternating current power at predetermined high frequencies.

20. In combination, a tunable oscillator, a frequency determining circuit for said oscillator, amplitude and feedback stabilizing circuits for said oscillator operative to produce substantially a sine-wave output voltage therefrom of predetermined amplitude, a phase-shift network coupled to said oscillator having resistance and reactance means connected in separate output channels for providing output voltages corresponding to the oscillator output voltage in differing phase relation, a low-pass filter circuit interposed between said phase-shift network and the oscillator having a cut-off frequency above the operating frequency of the oscillator, phase inverter circuit means coupled to the output circuits of said phase-shift network for converting the single phase output in each channel to push-pull positive and negative voltage waves, a balanced wave-shaper electronic amplifier coupled with each phase inverter means and biased to provide pulse waves of substantially less than one-half wave duration and of a predetermined high amplitude, a full-wave thyratron power inverter comprising a pair of balanced inverter tubes having control grids impedance-coupled in push-pull relation to each of said last-named amplifiers, and means for applying a biasing potential to said thyratron inverters through said coupling networks.

21. An exciter system for thyratron power inverter and high frequency motor control, comprising in combination, a variable frequency sine-wave voltage source, a phase-shift network coupled to said source for receiving the sine-wave output therefrom and comprising a pair of parallel branch reactance-resistance circuits, each of said circuits having an output connection thereon for dividing the sine-wave output voltage into two sine-wave voltages of differing phase, electronic tube amplifier means for transforming each of said sine-wave output voltages into push-pull voltages of predetermined amplitude, additional electronic tube amplifier means for modifying each of said push-pull sine-wave voltages to provide corresponding exciting pulses at the same frequency, and impedance coupling output networks for said amplifier means adapted for coupling with the control grid circuits of two full-wave thyratron inverters or the like, whereby alternating current power may be provided at the frequency of said sine-wave source.

22. An exciter system for thyratron power inverter and high frequency motor control, comprising in combination, a variable frequency sine-wave voltage source, a phase-shift network coupled to said source for receiving the sine-wave output therefrom and comprising a pair of parallel branch reactance-resistance circuits, each of said circuits having an output connection thereon for dividing the sine-wave output voltage into two sine-wave voltages of differing phase, electronic tube amplifier means for transforming each of said sine-wave output voltages into push-pull voltages of predtermined amplitude, additional electronic tube amplifier means for modifying each of said push-pull sine-wave voltages to provide corresponding exciting pulses at the same frequency, a plurality of full-wave thyratron inverter power controlling circuits including two pairs of push-pull input grid circuits therefor, and impedance coupling networks for applying each of said exiciting pulses to each pair of said grid circuits in balanced relation, thereby to control said thyratron inverter circuits at the frequency of said sine-wave voltage source for the production of alternating current power corresponding thereto in frequency.

GALAN W. DEMUTH.

REFERENCES CITED

The following references are of record in the file of this patent:

UNITED STATES PATENTS

| Number | Name | Date |
|---|---|---|
| 1,934,400 | Bollman | Nov. 17, 1933 |
| 2,117,587 | Young | May 17, 1938 |
| 2,385,641 | Peterson | Sept. 25, 1945 |
| 2,404,344 | Wild | July 16, 1946 |
| 2,446,607 | Peterson | Aug. 10, 1948 |